Jan. 8, 1946.    R. ANSCHÜTZ ET AL    2,392,515
DEVICE APPLICABLE FOR BOOKKEEPING-CALCULATING AND SIMILAR MACHINES
Filed Jan. 10, 1941    11 Sheets-Sheet 6

Inventors,
R. Anschütz &
E. H. Kümmel
By: Glascock, Downing & Seebold
Attys.

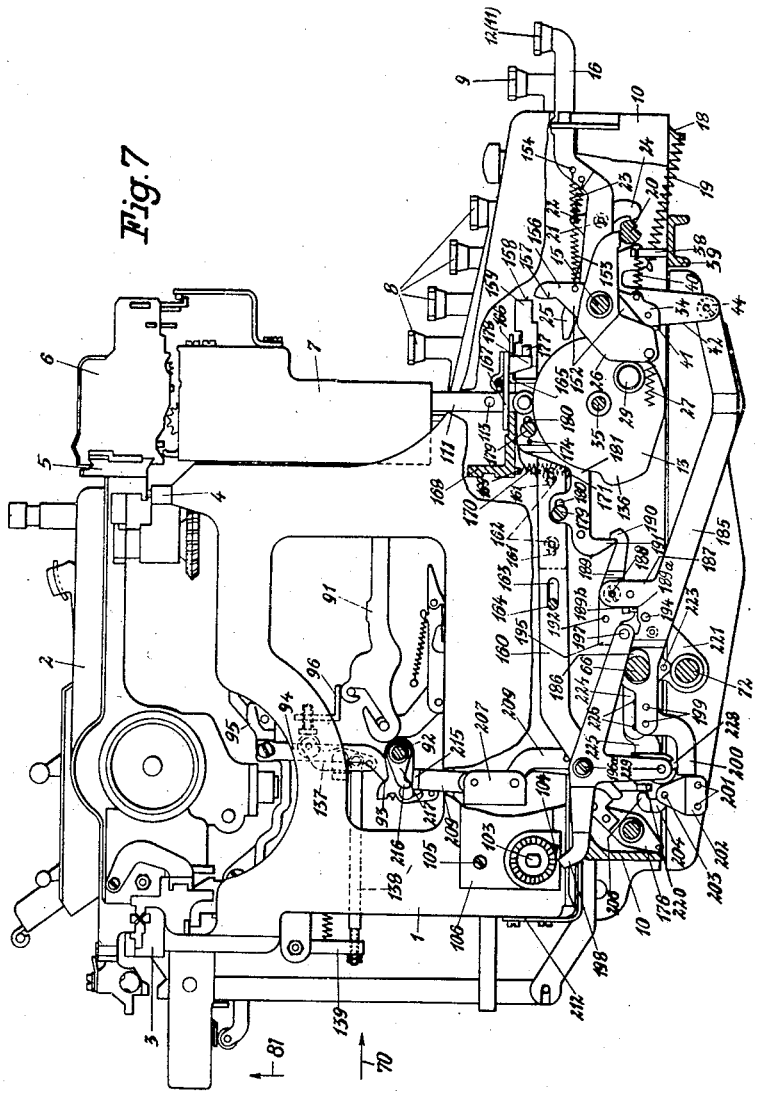

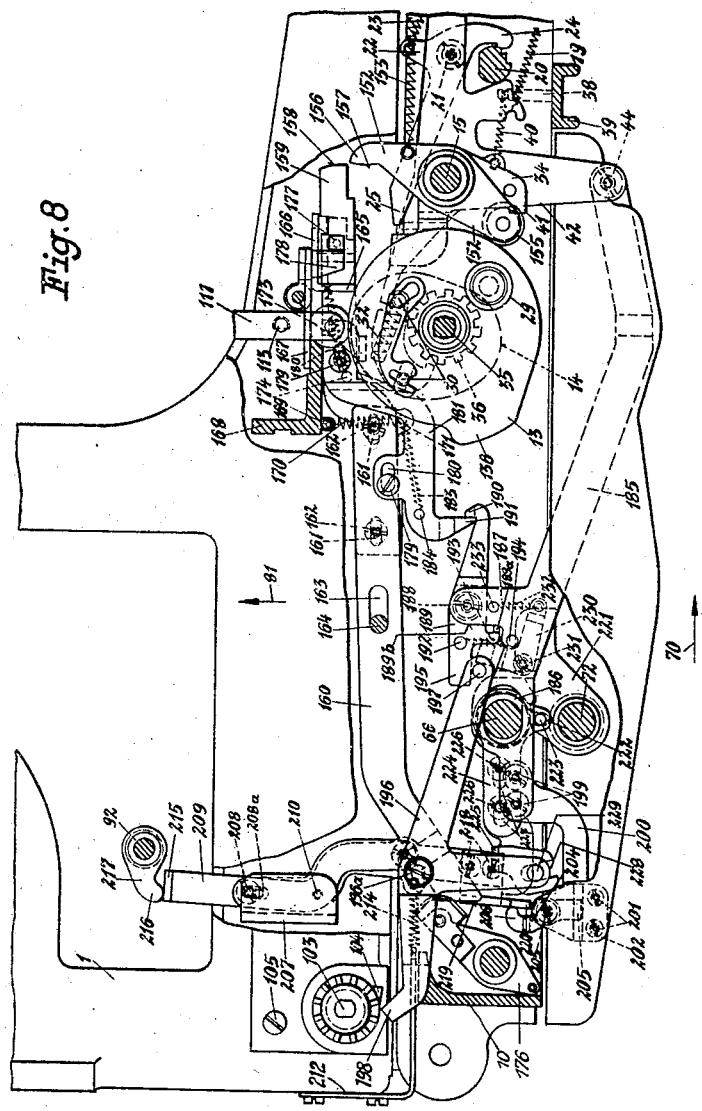

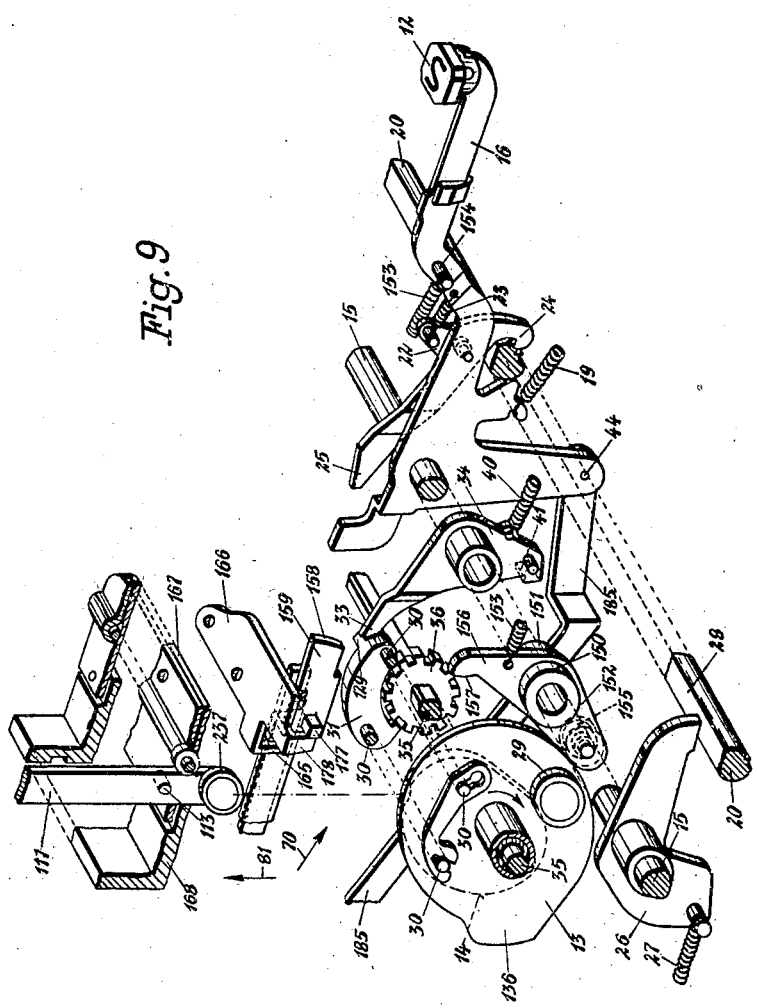

Jan. 8, 1946. R. ANSCHÜTZ ET AL 2,392,515
DEVICE APPLICABLE FOR BOOKKEEPING-CALCULATING AND SIMILAR MACHINES
Filed Jan. 10, 1941 11 Sheets-Sheet 11

Inventors
R. Anschütz
E. H. Kämmel
By: Glascock Downing Seebold
Attys.

Patented Jan. 8, 1946

2,392,515

UNITED STATES PATENT OFFICE 2,392,515

DEVICE APPLICABLE FOR BOOKKEEPING-CALCULATING AND SIMILAR MACHINES

Robert Anschütz and Ernst Hugo Kämmel, Zella-Mehlis, Germany; vested in the Alien Property Custodian Application January 10, 1941, Serial No. 373,996
In Germany January 18, 1940

10 Claims. (Cl. 235—59)

This invention relates to typewriting-calculating machines having means for automatically operating the typing mechanism according to a total in a totalizer.

The general object of the invention is to provide means for determining that only the significant orders in a totalizer be printed from, as where a total does not involve the higher totalizer orders which, therefore, stand at insignificant-figure or zero positions, and a read-out mechanism successively operates on each of all the totalizer orders beginning with the highest order.

The invention deals particularly with providing such determining means in association with total typing means of the kind featured in the British patent, Mercedes, etc., No. 496,720, accepted December 1, 1938.

These and incidental objects and features of the invention will be further apparent from a reading of the following description of two forms of embodiment of the invention.

In the accompanying drawings—

Fig. 2A is a left side view of type selecting and operating mechanism.

Figures 7–12 show another form of the invention, viz:

Fig. 7 is a left side view of a typewriting-calculating machine with the novel devices in normal positions.

Fig. 8 shows a portion of Fig. 7 upon an enlarged scale.

Fig. 9 is a perspective of the coupling device as seen from left front of the machine.

Fig. 10 is a perspective of parts shown in Fig. 7.

Fig. 11 is a left side view of parts of Fig. 7 in operated positions, upon an enlarged scale.

Fig. 12 is a left side view of parts of Fig. 8 in operated positions.

General description of the machine

Figure 1:
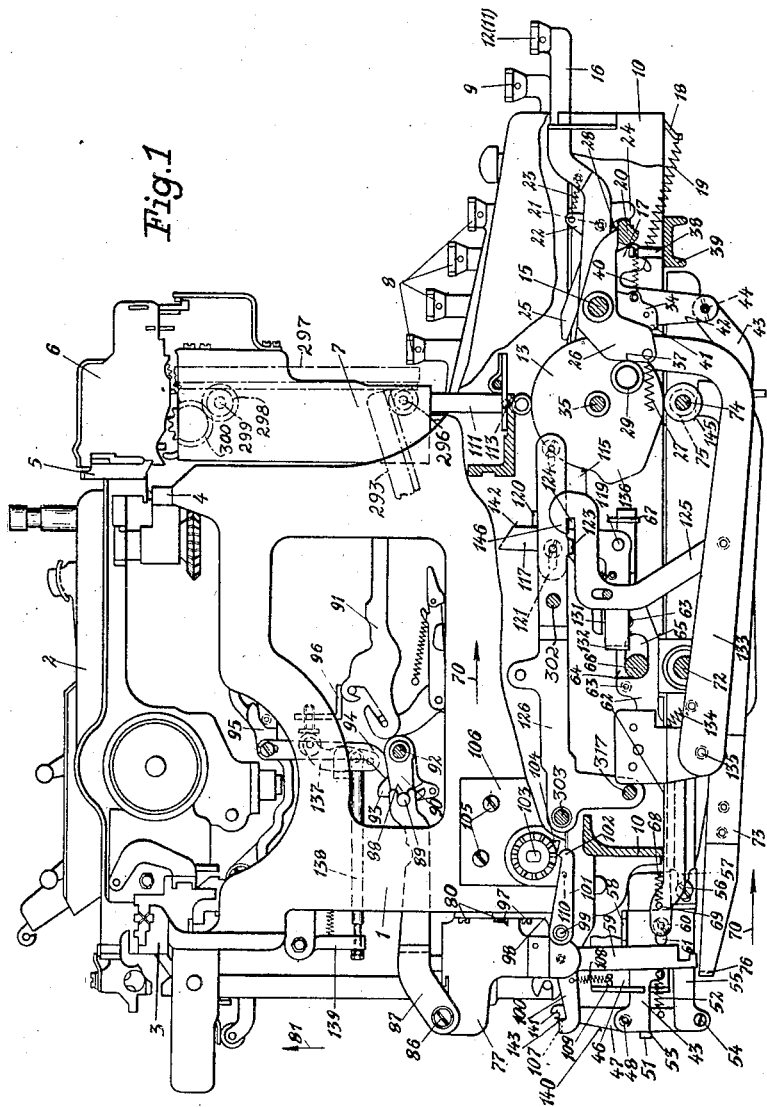
Fig. 1 is a left side-view of a typewriting-calculating machine equipped according to the invention.

The machine includes a frame 1 (Figs. 1 and 3) carrying the typing mechanism, a paper carriage 2 running on rails 3 and 4 of frame 1, and column or idle totalizers 6 which can be put on and removed from the totalizer suspension rail 5 on the carriage. An amount-entering mechanism 7 is disposed at the front side of the machine. A keyboard 8 is for typing and a keyboard 9 controls a decimal tabulator.

Figure 3:
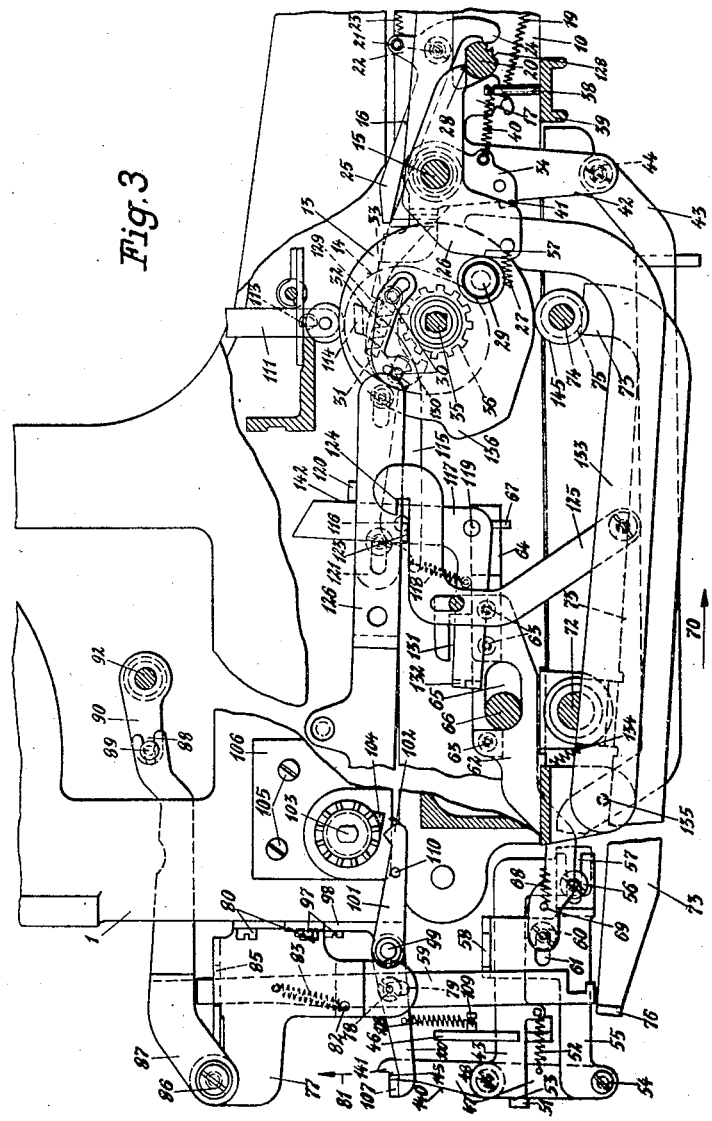
Fig. 3 is a left side view of the typewriting-calculating machine showing further details.

A base frame 10 supports calculating keys 11 (Fig. 1) and associated cams, not shown, and a total taking key 12 having a lever 16 associated with cams 13 and 14 (Fig. 3). A motor, not shown, is mounted at the right side of the machine frame 1 and by means of gears drives a shaft 35 to which said cams may be coupled under control of their keys. The motor also drives a shaft 313 to which the type actions are connectable.

In typewriting-accounting machines, it is customary to provide a series of column totalizers 6 and one or more cross footing or grand totalizers, not shown.

The items entered in their proper columns, are either added to or subtracted from the cross footing or grand totalizers, depending upon whether such items are debits or credits.

At the end of the bookkeeping operations, the totals of the several debit and credit items entered are registered on their appropriate debit and credit column registers, respectively, and the grand total of the debits less credits, or vice versa, is registered on the proper cross footer.

It is customary to provide such a typewriting-accounting machine with totalizers and cross footers of greater capacity than the highest totals of amounts handled by the businesses using such machines.

Hence, the large majority of total amounts registered on the totalizers are likely to comprise a lesser number of denominations than the capacities of their respective totalizers.

In automatically printing such totals, it is desired that the insignificant or non-s'gnificant ciphers or zeros above the digit of highest denomination be suppressed.

This can be effected by pressing the proper denominational tabulating key whereby to shift the carriage and its totalizers directly to such position as to bring the totalizer wheel bearing the digit of highest denomination of that totalizer, the total of which is to be printed, into engagement with the master wheel.

Such procedure, however, requires the operator to read the total and then select the proper tabulating key, with a possible chance of error in reading the total and in depressing the proper tabulating key.

The present invention avoids these possible failures by providing means which automatically suppresses the printing of the non-significant zeros, so that all the operator is required to do is to depress the universal column tabulating key each time a succeeding totalizer is to be brought to the calculating zone, and then depress the total key initiating automatic total printing, as is customary. Depression of the universal tabulating key results in the arrest of the totalizer with its wheel of highest denomination engaged with the master wheel.

Conveniently, this invention is applied to the Mercedes typewriting-accounting machine well known among those acquainted with the art, and illustrated for example in the U. S. application of Robert Anschütz, Serial No. 146,897, filed June 7, 1937, now Patent No. 2,347,235, issued April 25, 1944, directed to Automatic total printing typewriting accounting machines.

Mechanism and its operation for operating the types for total printing are as described in detail in the aforesaid British Patent No. 496,720, and the following brief description thereof will be found sufficient for an understanding of the present invention.

Figure 2:
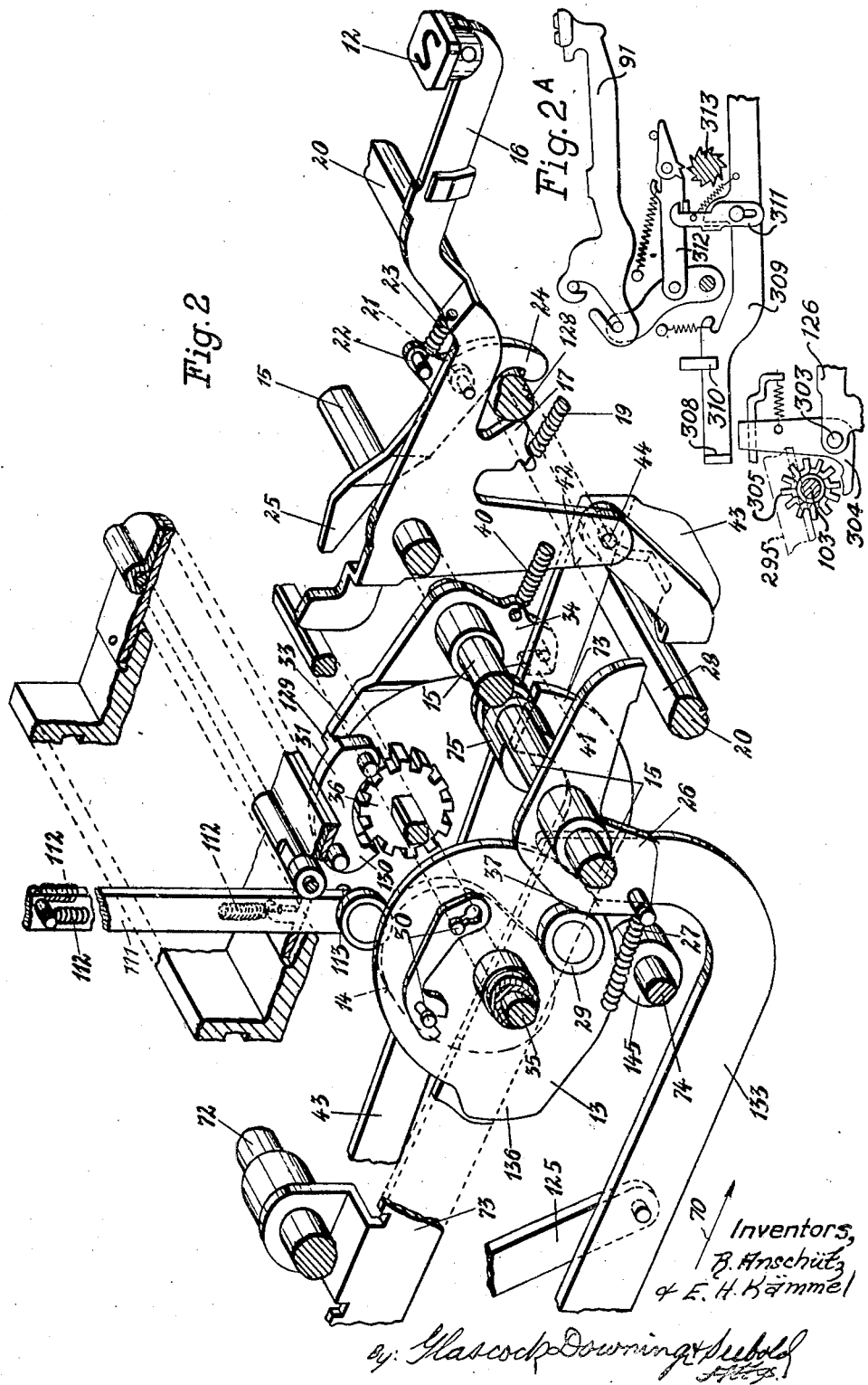
Fig. 2 is a perspective view of control members shown in Fig. 1, viewed from the left front of the machine, and in which, for better illustration, some parts are shown separated from one another.

A rack 295, partly shown in Fig. 2A, at the rear end of a rack bar meshes with a pinion fixed to the type bar selecting shaft 103, said rack bar extending forwardly and being equipped at its forward end with a rack 293, partly shown in Fig. 1, meshing with a gear fixed to a short shaft 296 at the left side of the amount-entering mechanism 7. Another pinion fixed to said shaft 296 directly in line with pinion 293, meshes with a rack on a vertically movable zeroizing rack bar 297. A gear 298 is splined to a master wheel driving shaft 299 which drives a master wheel 300 with which the denominational order gear trains of a totalizer are engageable seriatim in well-known manner as the carriage and totalizer travel through a computing zone.

The splined gear 298 is shiftable into and out of mesh with the upper toothed end of the zeroizing rack bar 297, which zeroizing rack bar is normally latched in its upper position against the influence of a spring (not shown) tending at all times to advance the rack bar 295, 293 and hence, through the pinions on shaft 296, tending to shift the zeroizing rack bar 297 downwardly.

A release and restoring slide 111 (Figs. 1-3, 5 and 7) associated with the zeroizing rack bar 297, is urged downwardly by springs 112, the lower end of said release and restoring slide resting on the high point of the cam 14.

The slide 111 at the initial part of its spring-urged descent controlled by cam 14, operates means, not shown, to shift the splined gear 298 sidewise into mesh with the upper part of the zeroizing rack bar 297 so that, thereby, the type selector shaft 103 becomes operatively connected to the master wheel driving shaft 299 through the train comprising the described parts 295, 293, 296, 297, and 298. Further cam-controlled descent of the trip and restoring slide 111 releases the zeroizing rack bar 297 from a detent, not shown, and permits the entire said train to move to zeroize that totalizer order which is in mesh with the master wheel 300. The spring, not shown, applied to rack member 295, 293, drives said train in zeroizing movement. A zero stop device, not shown, cooperates with the totalizer order for arresting its rotation as the totalizer wheel restores to its zero position. It will be understood now that when a totalizer order is restored one or more digital units back to zero, the type selecting shaft 103 will be turned a corresponding number of units to select a corresponding type action for operation, as will now be described.

Figure 10:
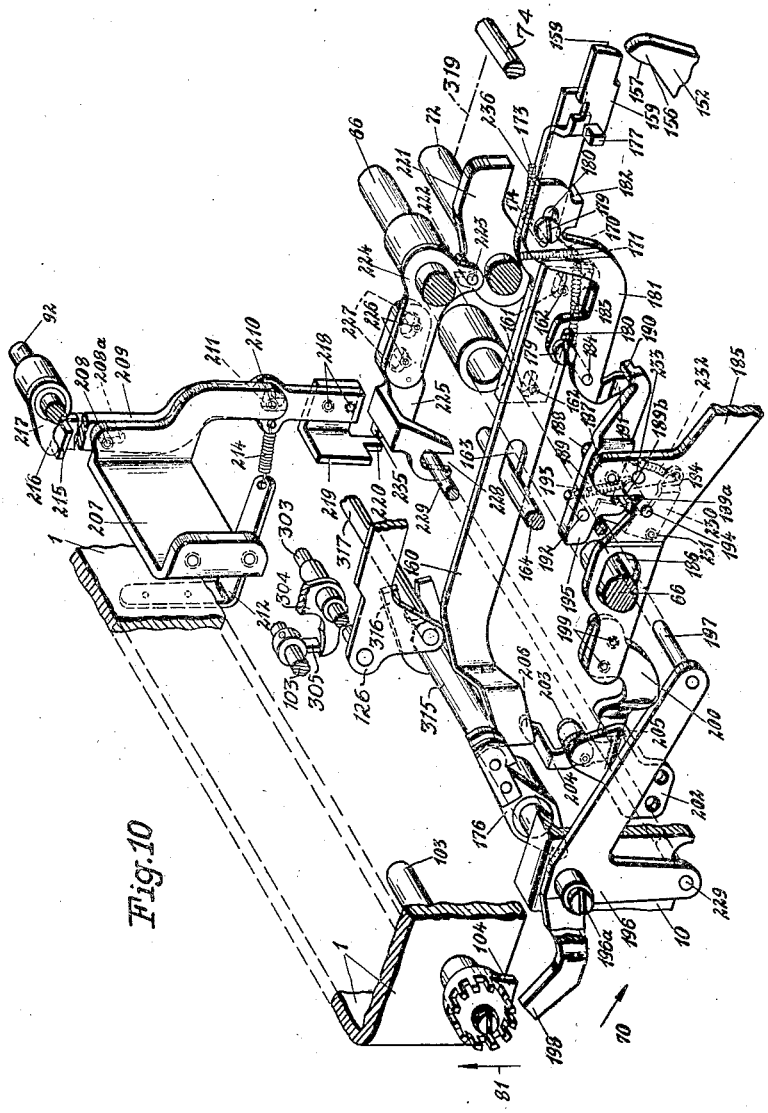

Left and right side members 126 of a rocking frame are fulcrumed at 302 and are connected by a suitable number of cross rods including the cross rod 303, Figs. 1, 2a and 10. Bell cranks 304, one for each numeral type action, are fulcrumed on and are disposed along the cross rod 303 in operative alignment with tongues 305 spaced helically along and around shaft 103. Normally, the type selecting shaft 103 is positioned so that the "0" tongue 305 is over a horizontal leg of the corresponding "0" bell crank 304. But if the shaft 103 has been turned one unit, the "1" tongue 305 will be over the "1" bell crank 304, and the "0" tongue will be displaced relatively to its associated bell crank, and so on.

After the angular position of shaft 103 has been determined by the zeroizing movement of the aforesaid train, the frame 126, 304 may be rocked clockwise about fulcrum 302 under control of the cams, as will be explained presently. This rocking of said frame raises rod 303 and its several bell cranks 304. Whichever rising bell crank 304 is opposed by its effectively positioned tongue 305 will be rocked counterclockwise on rod 303 so that its vertical arm encounters a lateral lug 308, Fig. 2A, on the corresponding type key lever 309 and rocks the latter clockwise about its fulcrum bar 310. By its hook link 311, the rocked key lever 309 draws a corresponding type action coupler 312 into engagement with the continuously rotating fluted shaft 313, and it results, as will be understood from Fig. 2A, that the corresponding type bar 91 will be operated to print the digit cleared out of the totalizer order by the zeroizing movement.

The rocking of the type selecting frame 126, 304 is effected by the following means.

An angle lever 117, Figs. 3-6, has a fixed fulcrum at 119. An operating lever 115, having a lug 114 engageable by a pin 113 of the trip and restoring slide 111, is pivoted at 116 to said lever 117. A spring 118 connects said levers 117, 115 and normally keeps them in abutment, as at 142, Fig. 5. When pin 113 of the descending trip slide 111 engages lug 114, it turns said spring-connected levers clockwise, as one, about pivot 119. The vertical edge 142 of rocked lever 117 engages a lug 120 of a coupler 121 slidably mounted on the frame member 126 and moves said coupler counter to its spring 122 in the direction of arrow 70. This engages the lug 123 of said coupler in the slot of a pull link 125 pivotally connected to an operating lever 133, the free forward end of which lies in the path of a stud 29 projecting from the cam 13. When said lever 133 is operated clockwise about its fulcrum 135 and counter to its spring 134 by its cam 13, the swing frame 126, 303 may be operated through the connection 123, 124 for effecting operation of the selected type action.

The total printing operating with or without clearing the totalizer is initiated by the depression of the total key 12 mounted on the outer end of a total taking lever 16 (Figs. 1-5) fulcrumed on the fulcrum rod 15 extending across and mounted in the sides of the frame 10.

A spring 19 yieldingly holds the total key lever in its normal raised position determined by contact of a projection 17 (Fig. 2) on the total key lever with the rear periphery of a locking bar 20 extending transversely of the machine frame, the spring being anchored to a spring suspension plate 18 (Fig. 1).

A key detent 22 pivoted at 21 on the total taking key lever 16, is provided with a hooked end 24 normally held against the front periphery of the locking bar 20 by its spring 23.

Depression of the total key 12 rocks its total taking key lever 16 clockwise, the key detent 22 rocking with the key lever until its hooked end 24, under the influence of the spring 23, engages a tooth 128 formed on the lower periphery of the locking bar 22 to retain the total key lever in its depressed position during the total taking operation, at the conclusion of which, a release member (not shown) engages the tail 25 of the key detent to disengage its hooked end from the locking bar 22 and enable the spring 19 to restore the total key lever and connected parts to their normal positions.

The forwardly extending arm of a cam arresting lever 26 fulcrumed on the rod 15 is held by a spring 27 in its normal position against the flattened upper face 28 of the locking bar 20, to maintain the angular rear arm of the arresting lever in the path of a roller 29 projecting from a side face of the cam 13, to prevent overthrow and back lash of the cam and its connected parts. The cams 13 and 14 are rigidly connected and form a cam-structure.

A clutch pawl 31 is slidably mounted by pins 30 in registering slots formed in the cams 13 and 14, for movement into and out of engagement with a driving ratchet 36 fast on the constantly rotating drive shaft 35. A spring 32 (Fig. 8) presses a rib 129 (Fig. 2) formed on one end of the clutch pawl 31 against the rearwardly projecting arm 33 of a clutch control lever 34 journaled on the fulcrum rod 15, which clutch control lever normally holds the clutch pawl out of engagement with its driving ratchet 36 against the tension of the spring 32.

The spring 32 tends to turn the cams 13 and 14, but is prevented by contact of the roller 29 of cam 13 against the angular end 37 of the arresting member 26, which retains the cams in their normal positions shown in Fig. 1.

A spring 40 (Fig. 1) anchored to a pin 38 projecting from a cross brace 39 of the frame 10, tends to rock the clutch control lever 34 counter-clockwise to its normal position determined by contact of a laterally turned lip 41 on the depending arm of the clutch control lever with the rear edge 42, (Figs. 2, 5, 7, 10 and 11), of the depending arm of the total key lever 16.

The foregoing structure, generally speaking, is old and constitutes a part of the present invention only insofar as it combines with the novel features now to be set forth.

*Description of the first form of the invention*

A rearwardly extending connecting bar 43 (Figs. 1 to 6) is pivotally jointed to the depending arm of the total taking lever 16 at 44. Said connecting bar 43 is guided laterally by a guide member 46 fastened to the frame 10 at 45 (Figs. 4, 5, 6) and vertically by a slot in a guide member 45b fastened to the frame 10 at 45a. A setting lever 47 is pivoted intermediate its ends on the rear end of the connecting bar 43 at 48.

Said setting lever 47 is urged anti-clockwise on pivot 48 by a spring 52 connected to the connecting bar 43, the normal position of the setting lever 47 being fixed by its lug 51 bearing against the edge 53 of the connecting bar 43.

The rear end of a slide link 55 is pivoted at 54 to the lower arm of the setting lever 47, the slide link extending parallel with and beneath the rear end of the connecting bar 43, and being slotted at its forward end, as at 57, to embrace and be supported by a headed screw 56 projecting laterally from the connecting bar.

An upwardly and laterally projecting flange 58 on the slide link 55 (see Fig. 4) co-acts with a letter spacing escapement control lever 59 as will be described later.

A locking slide 62 arranged parallel with and laterally of the connecting bar 43, is connected at its rear end to the slide link 55 by a slot-and-pin connection 61, 60, a spring 68 attached at 69 to the locking slide and to the guide member 45b (Fig. 5) operating to normally retain the locking slide advanced with its pin 60 at the forward end 71 (Fig. 4) of the slot 61 in the slide link 55.

Near its forward end, the locking slide 62 is recessed, along its edge, to fit beneath a guide rod 66, a complementarily recessed cap piece 64 being fastened to the locking slide at opposite ends of the recess therein, as at 63, 63, the cap piece 64 extending over the guide rod 66 with the complementary recesses forming a slot 65, whereby the forward end of the locking slide 62 is supported. The locking slide is thus constructed to facilitate its assembly in the machine.

The cap piece 64 is extended beyond the forward end of the locking slide 62 to enter a slot in a guide bar 67 secured to an intermediate wall of the frame.

The locking slide 62 has a rearwardly facing hook 131 normally lying in front of, but out of engagement with a laterally turned lug 132 on the rearwardly extending arm of the coupling control lever 117 pivoted at 119 and heretofore referred to, which controls the connection between the cam-operated lever 133 with its pull link 125, and the rocking type bar selecting frame 126.

A shaft 72 (Figs. 1 2 and 3) is journalled in frame 10 and an auxiliary escapement operating lever 73 (Figs. 2 and 5) is mounted so as to rock but not slide on said shaft. The forward and upwardly projecting arm of lever 73 cooperates with a sleeve 75 on the cross bar 74 of a rocking bail fully disclosed in my U. S. application, Serial No. 146,897, filed June 7, 1937.

Said bar 74 is part of a spring-elevated frame fulcrumed on a cross shaft, not shown, located at a point suitably to the left (rear) of said bar 74 so that the latter is movable vertically under control of the cam 13. Said frame, including bar 74, may function as part of a device for aiding the letter-feed movement of the carriage under control of the present cam 13, as described in the Anschutz U. S. Patent No. 2,141,158, issued December 27, 1938, in which the frame is identified by the reference numerals 6, 6a, 10 and the fulcruming cross shaft by 5. In the aforesaid British patent, such frame is also shown and has the reference numerals 376—379.

A lug 76 (Figs. 1, 3, 4 and 6) at the rear end of the auxiliary escapement operating lever 73 cooperates with the downward pointed arm of the escapement control lever 59 which is swingable on a headed screw 78 fastened in the supporting bracket 77. The headed screw 78 protrudes through a longitudinal slot 79 (Fig. 4) of the escapement control lever 59. The supporting member 77 designed as shown in Fig. 4 is fastened to the back wall of the frame 1 at 80 (Figs. 1 and 3).

Owing to the screw-slot-connection 78, 79, the escapement control lever 59 may swing as well as slide up and down. The spring 83 connected to the lever 59 and anchored at 82 to the supporting bracket 77 tends to slide the escapement control lever 59 downwards, its normal position being determined by the upper edge of the slot 79 striking against the headed screw 78. The rotation of the escapement control lever caused by the spring 83 is limited by contact of the upper arm of the escapement control lever 59 against the left (rear) end of a longitudinal guide slot 85 in the supporting bracket 77 (Fig. 4). The escapement control lever 59 cooperates with a superposed lever 87 fulcrumed at its rear end on the bracket 77 at 86.

The forward end of the lever 87 forked, as at 88 embraces a pin 89 of an arm 90 fixed on the supporting shaft 92 fixedly journaled in the frame, not shown, carrying the type levers 91. The arm 90 is connected with the universal U-member 96, as commonly used in typewriting machines, by a system of levers 93 to 95 (Fig. 1).

Figure 4:
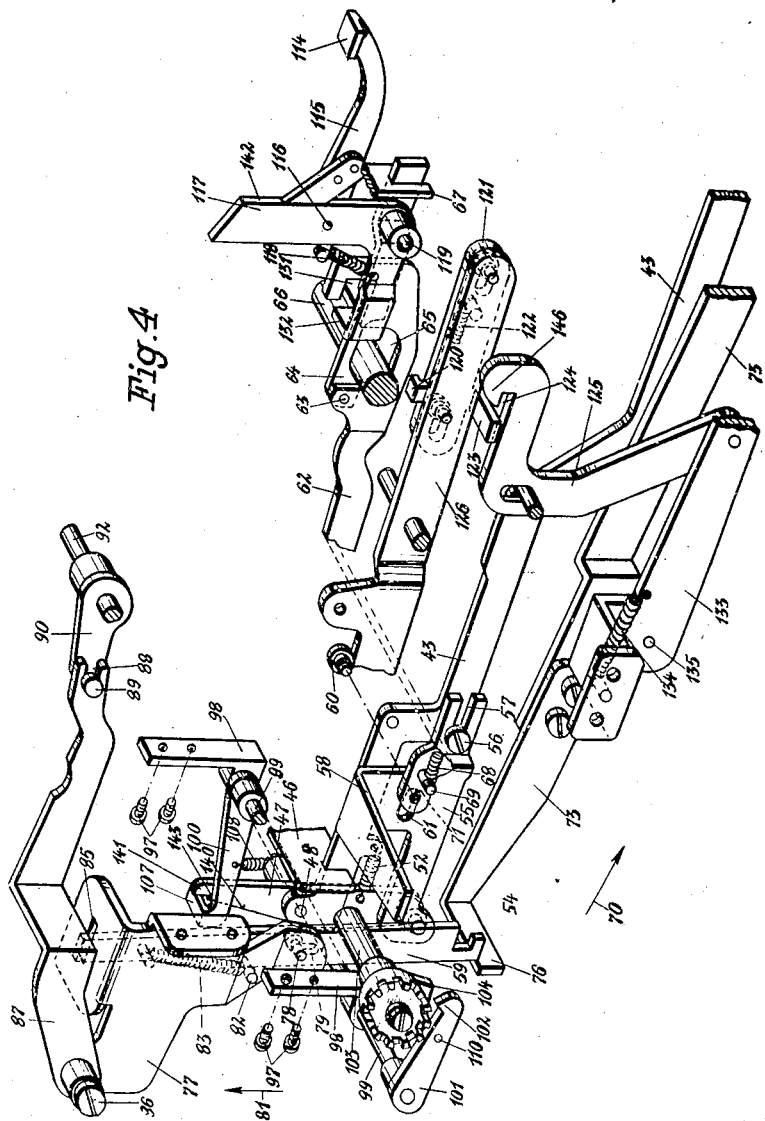
Fig. 4 is a perspective of several control members and in which for better illustration some of these are shown separated from one another.
Figure 5:
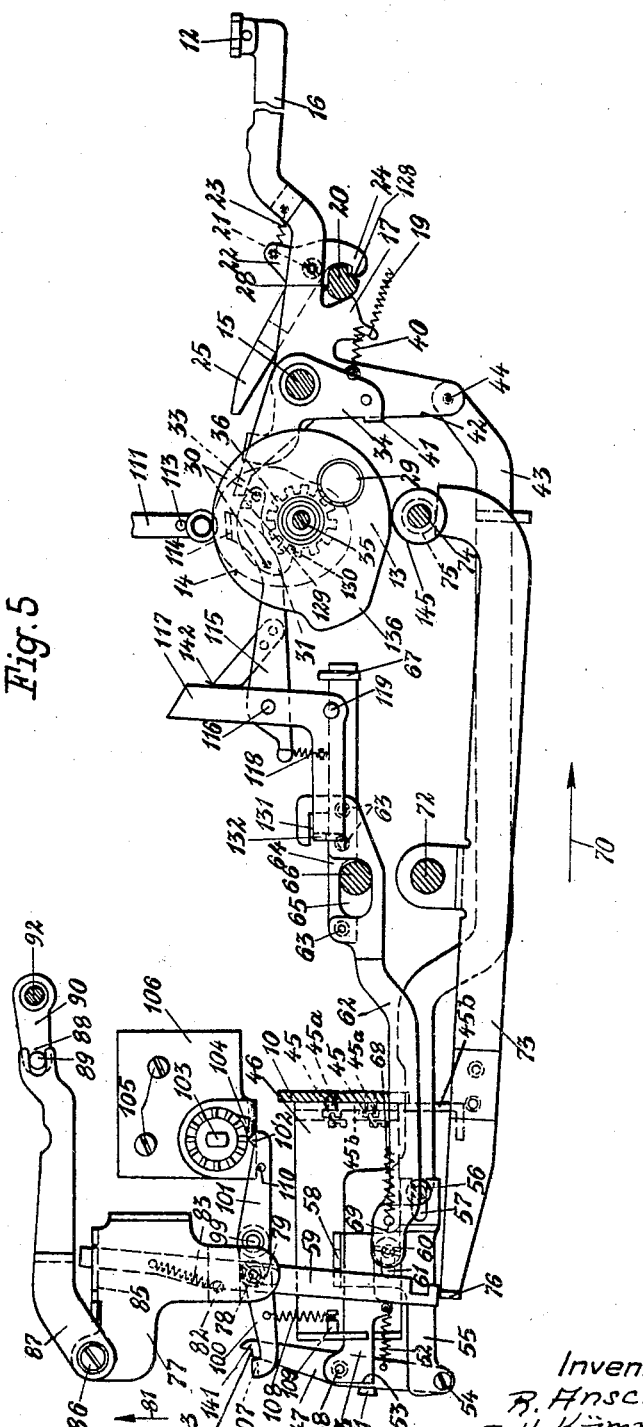
Fig. 5 is a left side view of parts of Fig. 3, in their operated positions.

A shaft 99 is journaled in the two bearings 98 fastened to the back wall of the machine frame 1 at 97 (Figs. 1, 3 and 4). A rearwardly extending crank 100 is fixed to the right hand end of the shaft 99 (Fig. 4) while a forwardly extending crank 101 is fixed to the left hand end of said shaft 99. The free end of the forwardly extending crank 101 has a nose 102 which cooperates with a cam tooth 104 fixed to a type-selecting shaft 103 journaled in a U-shaped bearing 106 which is fastened to the frame 1 at 105 (Fig. 1). The free end of the rearwardly extending crank 100 has an offset lug 107 (Fig. 4) cooperating with the upper end of the setting lever 47, said upper end being recessed, as at 143, leaving a reduced nose 141. The crank 100, the shaft 99 and the crank 101 are urged anti-clockwise by a spring 108 connected to the crank 100 and to a pin 109 (Fig. 3) of the supporting bracket 46. The normal position of the crank 100, the shaft 99 and the crank 101 is determined by the pin 110 fastened to the crank 101, striking against the supporting bracket 106 (Fig. 3).

When the machine is at rest, the off-set lug 107 of the crank arm 100 lies in contact with the unreduced upper end of the setting lever 47, and the nose 102 of the forwardly extending crank 101 lies behind and in the path of the cam tooth 104 on a disk-like member mounted on the end of the type bar selecting shaft 103. This cam tooth always returns to its home position shown in Fig. 1, for example, at the end of each of its cycles.

*Operation of the first form of the invention*

A totalizer 6 from which a total is to be printed is brought with its highest denomination in operating position by depressing, for instance, the corresponding tabulator key 9. It may be assumed that the totalizer registers several zeros before the first significant figure. Now, the total-taking key 12 (Figs. 1, 2) is depressed, causing the total-taking key lever 16 to be moved clockwise about shaft 15 against the spring 19 and also taking along the key detent 22. The arm 24 of the key detent slides off the locking bar 20, is moved clockwise around the pivot 21 by the spring 23 and finally catches in a notch 128 (Fig. 2) of the locking bar 20. Consequently, the total-taking key lever 16 and the key detent 22 are latched in their operating positions. The arm 25 of the key detent 22 is thus placed in operable position towards a releasing member, not shown, which later releases the total taking key lever 16.

Depression of the total-taking key lever 16 causes its edge 42 in contact with the lug 41 of the clutch control lever 34 to rock the latter clockwise about shaft 15. The clutch control lever 34 thereby releases the nose 129 of the clutch pawl 31 so that the latter is moved by its spring 32 to engage its nose 130 with the driving clutch wheel 36. Consequently, cams 13 and 14 are coupled with the shaft 35 which is constantly revolved by the motor. Depression of the total-taking key lever 16 shifts the connecting bar 43 rearwardly against the direction of the arrow 70.

It will be recalled that in the normal positions of the parts, the setting lever spring 52 holds the unrecessed edge 140 (Fig. 1) of the upper arm of the setting lever 47 in contact with the offset lug 107 of the rear crank 100.

Therefore, the connecting bar 43, on its rearward movement, rocks the setting lever 47 clockwise about its contact with the offset lug 107 as a center, causing the lower arm of the setting lever to draw the slide link 55 rearwardly, and, through the pin and slot connection 60, 61 with the rear end of the locking slide 62, to draw the slide bar 62 rearwardly whereby to fit its rearward opening latching hook 131 around the offset lug 132 on the rearwardly extending arm of the coupling control lever 117, preventing operation of the coupling control lever by the release slide 111.

The setting lever 47 in turning clockwise, further tensions the spring 52, the ear 51 on said setting lever receding from the rear extremity of the connecting bar 43.

Also in the normal position of rest of the machine, the upper end of the auxiliary control lever 59 for the escapement mechanism is held by its spring 83 (Fig. 4), out of line with a lateral portion of the connecting lever 87 which operates the letter spacing escapement, the lower end of said auxiliary control lever lying out of the path of the lug 76 on the rear end of the cam-operated lever 73.

The slide link 55 in its rearward travel, presses its offset flange 58 against the forward edge of the lower arm of the auxiliary escapement control lever 59 to rock the latter clockwise a sufficient distance to position the upper end of said auxiliary escapement control lever beneath the lateral portion of the connecting lever 87 for operating the escapement mechanism of the machine, and simultaneously, the rocking of the auxiliary escapement control lever 59 positions the lower end of said lever directly over the offset lug 76 at the rear extremity of the cam operated lever 73.

It will be recalled that tripping the clutch pawl 31 by depression of the total taking key 16 connected the cams 13, 14 with the drive shaft 35 for rotation and that the lower end of the spring-depressed total taking release slide 111 normally rests on the high point of the cam 14. Consequently as the cam 14 rotates the release slide descends.

A pin 113 projects laterally near the lower end of the release slide, and early in the descent of said release slide, the pin 113 contacts the forward end 114 of the trip lever 115 to rock such trip lever clockwise around its pivot 116 on the coupling control lever 117 and tension its spring 118 connected to the rearwardly extending arm of the coupling control lever.

Owing to the locking engagement of the hooked end 131 of the locking slide 62 with the offset lug 132 on the rearwardly extending arm of the coupling control lever 117, the coupling control lever 117 is prevented from rocking clockwise to connect the coupling slide 121 (Fig. 4) of the type bar selecting frame 126 with the pull link 125 of the cam-driven operating lever 133. Consequently, the cam rise 136 on cam 13 rocks the operating lever 133 and pull link 125 idly, tensioning spring 134, which restores the operating lever and pull link to normal position, after the cam rise escapes the free end of the operating lever.

Since the totalizer wheel of highest order is assumed to be engaged with its master wheel and to register an insignificant zero, the zero resetting rack bar 297 (Fig. 1) is locked in its upper position by the means disclosed in my prior application, Serial No. 146,897, and cannot descend.

Hence, the fore and aft rack bar 293 (Fig. 1), 295 (Fig. 2A) cannot advance to rotate the selecting shaft 103 to select another tappet 305 than the zero tappet of the spirally arranged series, which zero tappet is normally in effective position relatively to its individual type bar tripping bell crank 304.

And as the type bar selecting frame 126 carrying the set of type bar tripping bell cranks 304 is not rocked, the zero printing is automatically suppressed.

However, the operation of a type bar 91 is ordinarily relied upon to trip the escapement to enable the carriage to advance one denomination or order and present the succeeding totalizer wheel of next lower order to the master wheel, without which step by step advance automatic total printing could not proceed.

To compensate for the failure to trip the escapement in the usual manner, there has been provided the auxiliary letter spacing escapement control mechanism heretofore explained.

Thus, subsequently to its above-explained abortive operation of the type bar selecting mechanism 126, 304 (Fig. 2A), the cam rise 136 wipes over the roller 145 (Fig. 1) to rock downwardly the frame (not shown) carrying the cross bar 74, causing the roll 75 on said cross bar to depress the forward free end of the auxiliary escapement operating lever 73 and rock its rear end upwardly.

Upon such clockwise rocking of the operating lever 73, the offset lug 76 at its rear end collides with the lower end of the slotted auxiliary escapement control lever 59, sliding the latter upwardly on its pivot 78 to drive its upper end against the lateral bend of the connecting lever 87 to, in turn, rock the connecting lever counterclockwise, and, through the linkage 90, 92, 93, 96, and 137 to 139 (Fig. 1), to trip the carriage for one letter space, as explained in U. S. Patent 2,141,158, whereby to engage the totalizer wheel of next lower order with its master wheel. If said wheel of next lower order registers a zero also, the same automatic operations are repeated, due to continued depression of the total key 16 which maintains the various elements in their set positions to effect non-printing of non-significant zeros.

In the further description of the operation of the invention, it should be borne in mind that the total key 16 remains depressed throughout the step by step passage of the several successive wheels of a totalizer past the master wheel and throughout such period the total key retains the connecting bar 43 in its rearward position. Therefore, until the totalizer wheel registering the significant digit of highest denominational reaches the master wheel, the setting lever 47 is held with its lug 51 out of contact with the extremity of the connecting bar 43.

Likewise, the slide link 55 is held in its rearward position to retain the hooked end 131 of the locking bar 62 in effective position relatively to the lug 132 on the rear arm of the coupling control lever 117. Also the projecting flange 58 of the slide link 55 continues in contact with the auxiliary escapement control lever 59 to hold the lever with its lower end in its effective relation with the lug 76 on the operating lever 73 and its upper end in operative relation to the escapement connecting lever 87.

Furthermore, the type bar selecting shaft 103 remains with its tripping tooth 104 to the right of the nose 102 on the forwardly extending crank arm 101 as long as totalizer wheels registering non-significant zeros are presented to the master wheel, and when totalizer wheels registering significant digits are engaged with the master wheel for operation, the selecting shaft 103 and its tooth 104 rock from and return to the normal position.

When the totalizer wheel registering the significant digit of highest denominational order is engaged with its master wheel, the co-acting zero arresting stops (not shown, but present in application Serial No. 146,897) which prevent descent of the zero resetting rack bar 297 (Fig. 1) when a totalizer wheel is in zero position, are spaced apart a number of steps equal to the value of the digit registered on the totalizer wheel.

Consequently, there is nothing to prevent descent of the zero resetting rack bar 297 until the co-acting zero arresting stops contact, and therefore, the spring-actuated fore-and-aft rack bar 293, 295 (Figs. 1 and 2A) is free to advance until the co-acting zero arresting stops engage.

The fore-and-aft rack bar 293, 295, on such advance, rotates the selecting shaft 103 to position the proper tappet 305 in operative relation to its individual type-bar tripping bell crank 304, as heretofore explained.

Figure 6:
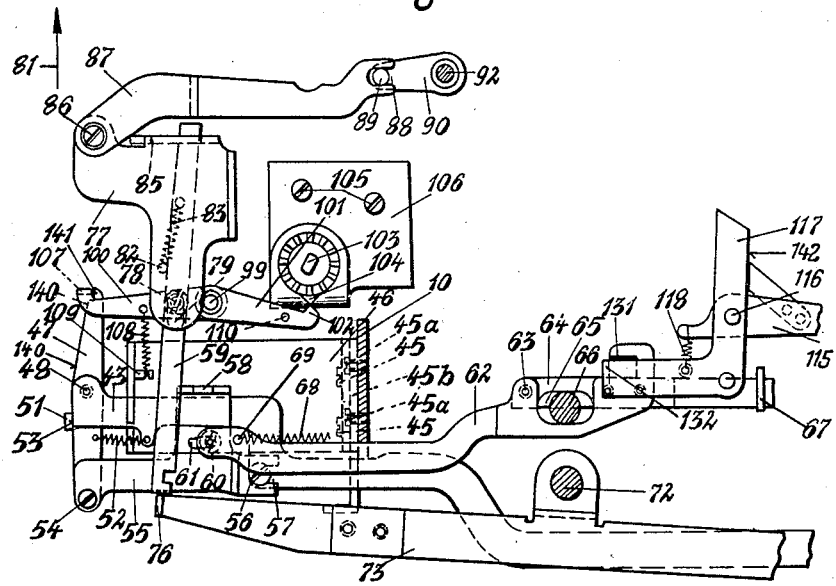
Fig. 6 is a left side view according to Fig. 5, some parts having resumed their rest positions.

In so doing, the tooth 104 (Figs. 1, and 3-6) rotating with the selecting shaft 103 acts upon the nose 102 of the forwardly extending crank 101 (Fig. 6) rocking the latter as well as the shaft 99 and the rearwardly extending crank 100 clockwise against the tension of the spring 108. Therefore the lug 107 of the crank 100 releases the edge 140 of the setting lever 47 to enable the setting lever to be rocked anti-clockwise around the pivot 48 by the pull of the spring 52 until arrested by contact of the recessed end the nose 141 of the setting lever 47 against the lug 107 of the crank 100 (Fig. 6).

Owing to the anti-clockwise movement of the setting lever 47 around its pivot 48, the slide link 55 is also moved part way of its full extent of travel in the direction of the arrow 70. The locking slide 62, 64 through the action of its spring 68 follows the slide link 55 for the same distance, assuming the position shown in Fig. 6 in which the hook 131 of the locking slide 62, 64 has released the lug 132 of the coupling control lever 117.

During the partial movement of the slide link 55 in the direction of arrow 70, its flange 58 releases the auxiliary escapement control lever 59, whereupon the latter returns to its rest position shown in Fig. 1, by the action of spring 83, and interrupts the driving connection 59, 76.

The spring-pressed total taking release slide 111 is now permitted to descend by its cam 13, and rocks the coupling control lever 117 clockwise. Consequently the edge of the coupling control lever 117 acts upon the lug 120 (Figs. 3 and 4) of the coupling slide 121, to shift the same in the direction of arrow 70, whereby the driving connection 123, 124 (Fig. 1) is established.

Now the cam 13 with its raised part 136 acts upon the operating lever 133 moving it against the spring 134 around the pivot 135. This operates through the now established driving connection 123, 124 to operate the rocking type bar selecting frame 126, 103 and its bell cranks 304. It follows that the value in the totalizer 6 will be printed by the typing lever 91 and the latter will operate the universal bar 96 for a letter-feed-step of the carriage.

The cam 13 also acts upon the roller 145 to depress the cross bar 74 of the frame for aiding the carriage letter-feed-step and the sleeve 75 incidentally rocks lever 73 clockwise around the pivot 72. The lug 76 of said lever 73, however, does not act upon the auxiliary escapement control lever 59 owing to the interruption of the driving connection 59, 76, as already described.

After recording the last value from the operative totalizer 6, a releasing member, not shown, acts upon the end of the key detent 22, so that the total-taking key lever 16 returns to its rest position. Simultaneously the clutch control lever 34 is also returned to its rest position by the spring 40 to lie in the path of the nose 129 of the clutch pawl 31, whereby the cams 13 and 14 are uncoupled from the constantly revolving shaft 35.

When the total-taking key lever 16 returns to its rest position, the connecting 43 as well as the setting lever 47 jointed to it are moved in the direction of arrow 70.

Return of the connecting bar 43 in forward direction to its normal position draws with it the pivot 48 of the setting lever 47, which action operates in conjunction with the spring 52 to straighten the lever from its slightly angular position, enabling the lug 51 on the lever to again contact the extreme rear end of the connecting bar 43, whereupon the setting lever accompanies the connecting bar as the latter continues its return. As a result, the shoulder 143 (Fig. 1) at the upper end of the setting lever releases itself from the lug 107 of the rearwardly extending crank arm 100, whereupon the spring 108 restores crank arms 100, 101 and shaft 99 counterclockwise to their normal positions.

Owing to the rocking of the setting lever 47 in the direction of arrow 70, the slide link 55 is also moved in the direction of arrow 70, so that the locking slide 62, 64 is returned by the spring 68 to its normal position shown in Fig. 1.

If, for instance, a "zero" is included in a total, as in the figure "50678," this zero is printed since the device for preventing the printing of the insignificant zeros has been made inoperative by the cam 104 acting upon the nose 102 of the crank arm 101, thus releasing the lock 131, 132.

*Description of the second form of the invention*

As far as the parts of the second form of construction correspond with the parts of the first form, the same characters of reference have been used.

An operating lever 152 (Fig. 9) having hubs 150, 151 is mounted to swing but not to slide on the fulcrum rod 15. A spring 153 connected to lever 152 and to a pin 154 on the totalizer key lever 16 urges the lever 152 clockwise, the rest position of the lever 152 being determined by a roller 155 mounted on the lower arm of the lever and bearing against the cam 13. The upper end 156 of the lever 152 has a striking face 157 for cooperating with the front end 158 of a sectional thrust bar 159, 160 (Fig. 8). The driving connection 157, 158 is interrupted in the rest position of the parts, Fig. 7.

The sections 159 and 160 of the thrust bar are adjustably connected by means of a screw-slot connection 162, 161. The thrust bar 159, 160 has a slot 163 by which it is mounted to swing as well as to slide on a pivot pin 164 supported in the left hand wall of the machine frame 1. The thrust bar 159, 160 is also guided by the section 159 sliding in a guide slot in a flange 165 of a guide member 166 fastened to a plate 167 attached to a ledge 168 for the usual roller locking device of the key levers of a typing keyboard 8.

A spring 170 attached to a pin 169 fastened to the ledge 168 and to a pin 171 in the section 159 of the thrust bar 159, 160, constantly tends to move the thrust bar upwardly in the direction of arrow 81, the upper edge of the section 159 approaching the ledge 168 from below. The thrust bar 159, 160 is urged forwardly in the direction of arrow 70 by a spring 173 connected to a pin 174 of the section 159 and to the flange 165 of the guide member 166 (Fig. 9). The normal position of said thrust bar 159, 160 is determined by the rear end of the slot 163 striking against the pivot pin end 164. The rear left end, Fig. 8 of the section 160 is offset towards the left (Fig. 10) to be rocked clockwise to a position in line with the enlarged head of a crank arm 176 fast on a rock shaft 315 journaled in the opposite sides of the sub-frame 10. When the rear end of the thrust bar 159, 160 is positioned opposite and in line with the enlarged head of the crank arm 176, and the thrust bar is driven rearwardly by the operating lever 152 it rocks the arm 176 and its rock shaft 315 counterclockwise. Forked arms 316, of which one only is shown, fast on the rock shaft 315 embrace the cross brace 317 connecting the side arms of the rocking type bar selecting frame 126 (Figs. 1 and 10) journaled in the frame, to effect actuation of the type bar selecting frame from an impulse delivered by the operating lever 152 to the sectional thrust bar 159, 160, as disclosed in my Patent No. 2,286,887, issued June 16, 1942. The type bar selecting frame includes the cross rod 303 on which the type bar selecting bell cranks 304 are journaled.

A square stud 177 projecting laterally from the section 159 of the thrust bar near its forward end, cooperates with an abutment 178 depending from the guide member 166. A coupling slide 181, as shown in Fig. 10, is mounted to shift longitudinally of the thrust bar 159, 160 by means of two-screw-slot connections 179, 180. The coupling slide 181 is provided with an offset, forward extension connected thereto by a U-shaped bond 182 which forms a seat for the section 159 of the thrust bar 159, 160 and presents a land or contact face 236 normally in the path of descent of the pin 113 on the total taking release slide 111. The spring 170 normally holds the forward end of the thrust bar 159, 160 upwardly out of the path of the cam-operated follower 152. Hence, when the release slide descends under control of its cam 14, the pin 113 contacts the land 236 and rocks the thrust bar clockwise to position its front end 158 in the path of the follower or operating lever 152. The coupling slide 181 is urged in the direction of arrow 70 by a spring 183 connected to a pin 184 of the slide 181 and to a pin 171 of the thrust bar 159, 160, the normal position of the slide 181 being determined by the rear ends of the slots 180 coacting with the screws 179. A bar 185 pivotally jointed to the depending arm of the total-taking key lever 16 at 44 has a longitudinal slot 186 (Figs. 7, 8, 10, 11, 12) slidably fitted to the shaft 66 journaled in the frame 10. A latching pawl 189 attached to an ear 187 on the bar 185 at 188, has a nose 190 which cooperates with a nose 191 provided on the rear end of the coupling slide 181. A spring 193, connected to a pin 192 of the latching pawl 189 and to a pin 194 on rod 185 tends to move said pawl anti-clockwise around the pivot 188, the pawl lug 189a normally contacting the edge 189b of the bar 185. The lower edge of the tail 195 of the latching pawl cooperates with a stud 197 projecting from a multiple control lever 196.

The control lever 196 is mounted to swing on the outside of the left side wall of the supporting frame 10 at 196a. The rearwardly extending arm of the control lever 196 has a nose 198 for cooperating with the cam tooth 104 on the differentially rotatable tongue-carrying shaft 103.

An off-set finger 200, Fig. 10, is attached to the rear end of the bar 185 (Figs. 8 and 10) at 199. A bracket 202 is fastened to the left side wall of the frame 10 at 201. A trip lever 204 has a pivot 203 on said bracket 202. The lower arm of the trip lever 204 has a lug 205 (Fig. 10) for cooperating with the off-set finger 200. The upper arm of the trip lever 204 is bent towards the right (Fig. 10) and has an upward pointed nose 206.

A U-shaped bracket 207 (Figs. 8 and 10) is fastened to the left side wall of the machine frame 1. An escapement controlling slide 209 is mounted to slide vertically and to swing about its pivot 208, in member 27, passing through a longitudinal slot 208a of said slide. The headed screw 210, in member 207, passes through an angular slot 211 of the escapement controlling slide 209. An angle 212 fastened to the back wall of the machine frame 1 anchors a spring 214 connected to the slide 209, which spring 214 tends to rock the slide 209 clockwise around its pivot 208, its normal position being fixed by the right hand edge of the horizontal part of the angular slot 211 fitting around the headed screw 210.

The upper end of the escapement controlling slide 209 has an off-set lug 215 (Fig. 10) which cooperates with a nose 216 of a crank 217 fixed on the escapement shaft 92 supported in a frame, not shown, which frame also carries the type bars 91 (Fig. 7) and is connected with the universal bar 96, by train of levers 93 to 95 (Fig. 7) more fully disclosed in my application, Serial No. 146,897, before referred to.

An off-set foot 219 (Fig. 10) is fastened to the lower end of the escapement controlling slide 209 at 218 and has a toe 220 which cooperates with the nose 206 of the trip lever 204.

A cam arm 221 (Fig. 10) is fastened to the pivot shaft 72 journaled in supporting frame 10.

Shaft 72 corresponds to the spring-pressed shaft 22, Fig. 3, of my aforesaid Patent No. 2,141,158, which discloses a rocking frame connected with the escapement mechanism to assist in operating the latter, in wide carriage machines.

A toggle lever structure connects the spring-driven shaft with the rocking frame of which the rod 74 herein shown (similar to rod 10 of said patent) forms a part.

In Fig. 10, a diagrammatic connection between spring-pressed rock shaft 72 and cross rod 74 is indicated by the dot-and-dash line 319. The spring-pressed rock shaft 72 normally holds the cross rod 74 with its collar 145 (Figs. 1-3 and 5) in contact with the periphery of the total taking cam 13. Hence, at each rotation of the main drive shaft 35, the cam 13 rocks the frame (not shown) including the cross rod 74 downwardly against the return influence of the spring-pressed rock shaft 72, resulting in rotating the rock shaft and its cam arm 221 counterclockwise and then clockwise. The cam arm 221 has a notch 222 in which is loosely seated a pin 223 projecting from the shorter arm of a supporting lever 224 fulcrumed on the cross rod 66.

A coupling link 225 having a U-shaped lateral extension is attached by pin-and-slot connections 226, 227 to the longer, rearwardly extending arm of the supporting lever 224. The free end of the lateral extension is forked, as at 228, to embrace a stud 229 projecting inwardly from the depending arm of the control lever 196.

The coupling link 225 is held in its normal rearwardly extended position relatively to the arm of its supporting lever 224 (Figs. 8 and 10) by the stud 229 of the control lever 196, which control lever is held in its clockwise (Fig. 10) limit of travel by the spring 193 of the latching pawl 189, which spring presses the tail 195 of the pawl downwardly upon the stud 197 of the control lever.

A detent 230 pivoted at 231 on the connecting bar 185 is rocked counter-clockwise by a spring 232 anchored at 233 to the connecting bar, until arrested by contact of one edge of the vertical arm of the detent against the stud 197 of the control lever.

Normally, the toe 220 of the escapement controlling slide 209 is positioned to the rear of and above the rear end 235 of the coupling link 225.

*Operation of the second form of the invention*

The carriage will have been positioned so that a totalizer 6 has its highest order in operating position and it is assumed that several zeros precede the first significant figure in the totalizer, the total-taking key 12 is depressed and a driving connection between the cams 13, 14 and the revolving drive shaft 35 (Fig. 7) is established.

By depressing the total-taking key lever 16 whereupon it is locked in depressed position as previously described, by the key detent 22, the connecting bar 185 is shifted rearwardly in the opposite direction of the arrow 70 and its off-set finger 200 acts upon the lug 205 (Fig. 10) of the trip lever 204 to rock it clockwise about the pivot 203. Accordingly, the nose 206 of the trip lever 204 acts upon the nose 220 of the off-set foot 219 fastened to the escapement controlling slide 209, whereby said slide 209 is moved against the spring 214 about its pivot 208 from the position shown in Fig. 7 anti-clockwise into the position shown in Fig. 11. Thereby the nose 220 of the off-set foot 219 is placed into the path of the shoulder 235 of the coupling link 225.

Figure 11:
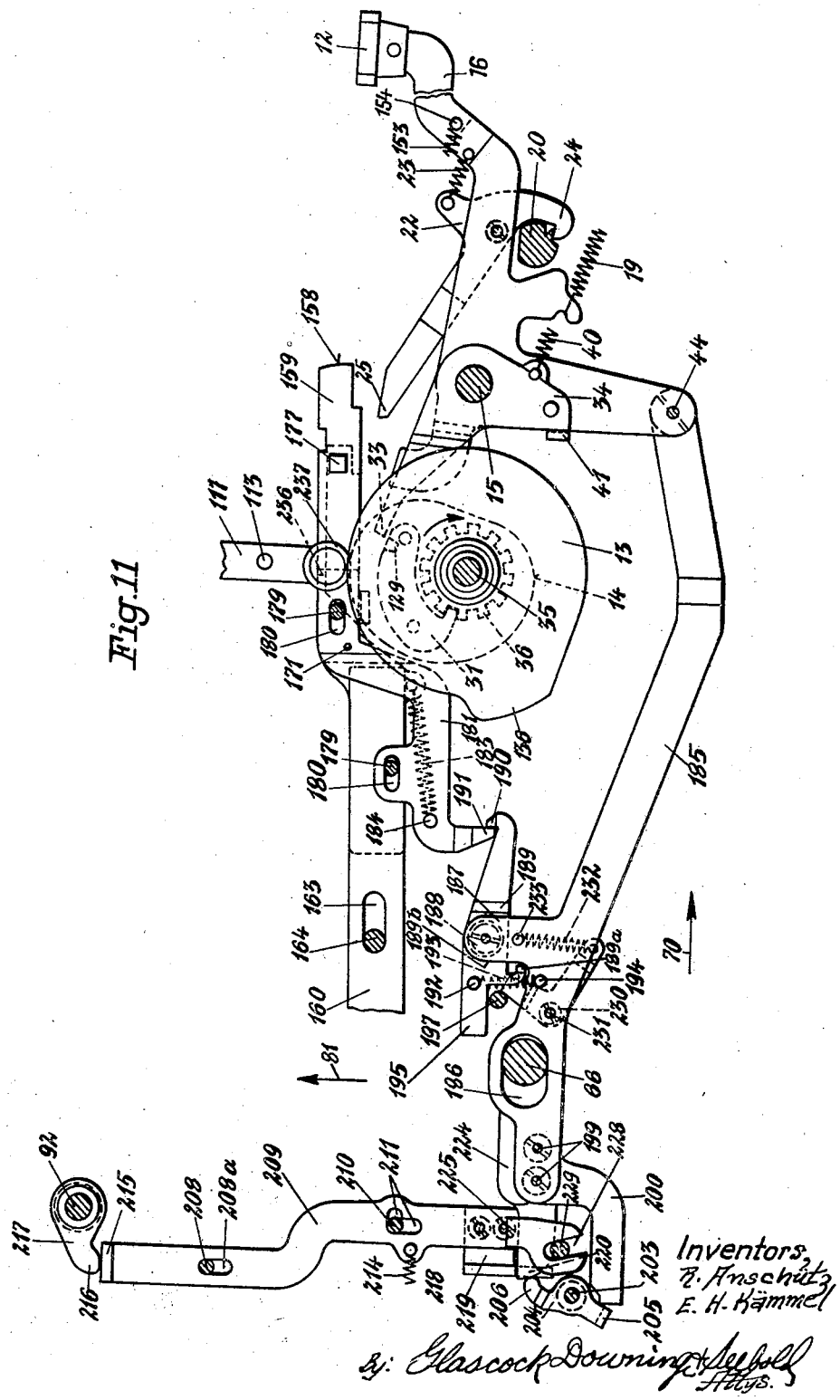

Owing to the connecting bar 185 being moved in opposite direction of the arrow 70, the lower edge of the tail 195 of its pawl 189 slides along the stud 197 of the control lever 196 assuming the position shown in Fig. 11 with respect to said stud. When the latching pawl 189 is moved in the opposite direction of the arrow 70, its nose 190 acts upon the nose 191 of the coupling slide 181 so that the latter is also moved, counter to spring 183, into the position shown in Fig. 11 wherein the land or contact face 236 (Fig. 10) of the coupling slide is shifted out of the path of the pin 113, Fig. 8, on the total taking rack bar release slide 111.

Owing to the contact of the operative end of the detent 230 with the stud 197 of the control lever 196, said detent is moved clockwise about pivot 231 and against the spring 232 to the Fig. 11 position by the rearward shift of the connecting bar 185.

Rotation of the two cams 13, 14 in clockwise direction will lower the releasing slide 111 by means of the spring 112 (Fig. 2) the pin 113 of the releasing slide 111 which will move ineffectively past the withdrawn land 236 (Fig. 10) of the coupling slide 181 and consequently the driving connection 158, 157 between the sectional thrust bar 159, 160 and the cam-driven lever 152 is not established. The lever 152 (Figs. 7 and 8) during its operation by the raised part 136 of the cam 13, therefore, does not operate the thrust bar 159, 160. Therefore, the frame 126, 303, 317 is not operated and hence the value in the highest order of the totalizer 6, in this case a zero, cannot be printed.

But the cam 13 with its raised part 136 (Fig. 1) acts upon the roller 145 (Fig. 1) and depresses rod 74 to aid the carriage letter feed as described in the aforesaid Patent No. 2,141,158. The shaft 72 and the cam lever 221 (Fig. 10) mounted on same are moved anti-clockwise by the operative connection 319, Fig. 10, when rod 74 is depressed. And owing to the pin-and-slot connection 223, 222, the supporting lever 224 and its coupling link 225 are moved clockwise about the cross rod 66 and the free end 235 of the coupling link 225 acts upon the toe 220 of the escapement controlling slide 209, moving the latter upwards. During this movement of the slide 209 it acts upon the nose 216 of the crank 217 to rock the shaft 92, Fig. 10, and the members 93 to 96 and 137 to 139, Fig. 7, whereby the carriage escapement mechanism is operated for a letter feed step of the carriage so that the totalizer 6 is brought with its next order into operative position. The cam operated parts, of course, return to normal positions as the cams 13, 14 complete their cycle.

If in this next totalizer order a "0" is shown, the process is repeated, and so on, until the totalizer order showing the first significant figure, as, for instance, "5," is in operating position. During the zeroizing withdrawal of the value "5" from the totalizer, the type selecting shaft 103, Fig. 1, is turned five units. At the first unit of movement of shaft 103 its cam 104 acts upon the nose 198 of the control lever 196 and rocks this lever anti-clockwise around the pivot 196a to cause the stud 229 mounted on its depending arm to shift the coupling link 225 forwardly in the direction of arrow 70. During this movement of the coupling link, the rear end 235 of said link moves to a position wherein it is ineffective to operate the escapement controlling slide 209.

During the anti-clockwise movement of the control lever 196 its stud 197 on the forwardly extending arm acts upon the tail 195 of the latching pawl 189 from below to rock the latching pawl clockwise about pivot 188 against the spring 193 and disengaging the nose 190 of the latching pawl 189 from the nose 191 of the coupling slide 181 which, therefore, is moved in the direction of arrow 70 by spring 183 so that the left hand edges of the slots 180 contact with the headed pins 179 and the coupling slide 181 resumes its normal position on the thrust bar 159, 160. Owing to the movement of the coupling slide 181 in the direction of arrow 70, its land 236 is restored into the path of the pin 113 of the releasing slide 111.

Figure 12:
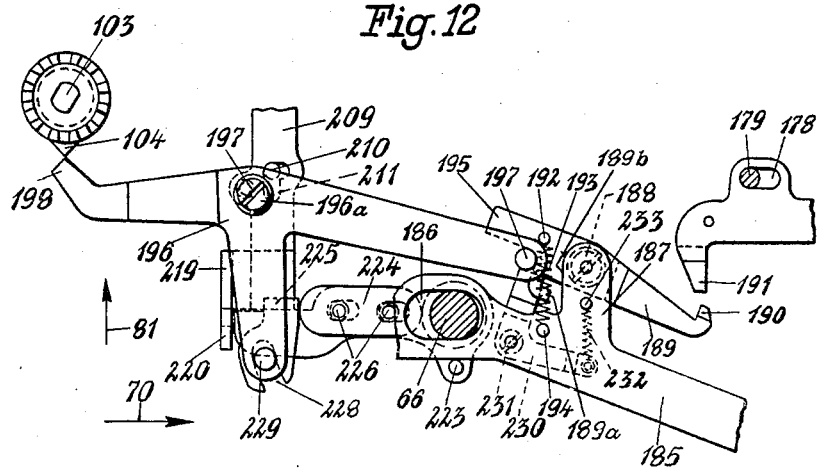

Owing to the clockwise movement of the control lever 196 into the position shown in Fig. 12, its stud 197 releases the detent 230 to the action of the detent spring 232 which rocks the detent counter-clockwise until it strikes against the stop pin 194, which arrests the effective end of the detent in the return path of the stud 197 to retain the control lever 196 and the latching pawl 189 in the positions shown in Fig. 12. If the releasing slide 111 is now moved downwards by the spring 112 (Fig. 2) owing to its roller 237 engaging the descending part of the cam 14, the pin 113 of the releasing slide 111 will act upon the land 236 of the coupling slide 181, whereupon the thrust bar 159, 160 is turned clockwise around the cross rod 164 to position its forward end 158 in the path of the nose 156 of the cam-operated lever 152 (Figs. 7 to 9). The lever 152 is now moved anti-clockwise around the fulcrum rod 15 the raised part 136 of the cam 13 acting upon the roller 155 of the cam-operated lever 152, to rock the upper end 157 of the lever 152 against the forward end 158 of the thrust bar 159, 160 to shift the thrust bar rearwardly and thereby operating frame 126, 303, 317 so that the value "5" from the totalizer 6 is printed.

During the rearward movement of the thrust bar 159, 160 its stud 177 comes to lie underneath the lug 178 of the bracket 166 for the purpose of preventing a premature interruption of the driving connection 157, 158 by premature anti-clockwise movement of the thrust bar 159, 160 by the spring 170 (Fig. 8) after its release by the pin 113 during return of the releasing slide 111.

During the further turning of the cams 13 and 14 in the direction of the arrow shown in Fig. 9, the raised part 136 of the cam 13 acts upon the roller 145 (Fig. 7) to depress rod 74 to aid the carriage letter feed. The carriage letter-feed escapement is operated by contact of the type lever 91 corresponding to the value "5" against the universal bar 96. During the depressing of the bar 74 and the accompanying rocking of shaft 72 the supporting lever 224 and the coupling link 225 attached thereto are rocked clockwise by the cam lever 221 (Fig. 10) on shaft 72. The free end 235 of the coupling link 225 does not act upon the toe 220 of the escapement control slide 209, however, since the coupling link 225 was shifted out of engagement with respect to the toe 220 of the slide 209 by the anti-clockwise movement of the control lever 196.

After recording or clear writing of the last digit from the operative totalizer 6, a releasing member, not shown, acts upon the tail 25 of the key detent 22, whereupon the totalizer key lever 16 returns into its rest position. Consequently the connecting bar 185 is returned into its rest position (Fig. 8) in the direction of arrow 70. Simultaneously the detent 230 releases the stud 197 of the control lever 196 so that the latter as well as the connected coupling link 225 and the latching pawl 189 again return to the positions shown in Fig. 8, by action of the spring 193 on the latching pawl 189. During the movement of the latching pawl 189 from the operative position shown in Fig. 12 to the normal position shown in Fig. 8, the nose 190 of the pawl 189 again comes to lie in front of the nose 191 of the coupling slide 181 so that the latter will be movable by operation of the total key lever 16 preparatory to taking another total.

Having now particularly described and ascertained the nature of our said invention and in what manner the same is to be performed, we declare that what we claim is:

1. In a typewriting-calculating machine having a totalizer comprising denominational orders, digit types, a carriage and a carriage-escapement device, the combination with a cam-structure power-operable in a series of cycles, one cycle for each totalizer order beginning with the highest order, a total-taking control operable to initiate the series of cycles, a type-selector; differentially positionable means acting during the successive cycles to position the type-selector to select the types according to the digits, including any non-significant digits, in the totalizer orders, and an actuator operable for actuating any selected type, of a first follower and a second follower cooperable with the cam structure in each cycle, controllable means movable by the first follower to connect operatively the type-actuator and the second follower, means conditioned by the total-taking control to control said movable means to prevent effective movement thereof by the first follower, normally ineffective means also conditioned by the operation of said total-taking control to enable said cam-structure to operate said escapement device, and means, controlled by the type-selector, to restore said two conditioned means as the type-selector is positioned for the first significant digit.

2. In a typewriting-calculating machine having a totalizer comprising denominational orders, and singly operable types and a carriage for typing a total digit-by-digit, the combination with two power-drive elements operable in cycles, a total-taking control settable to an operated position to initiate a series of cycles of said elements, one cycle for each order, a type-selector differentially positionable, means acting at the successive cycles to position the type-selector to select the types according to the successive digits including any non-significant digits, in the totalizer, and an actuator operable for actuating any type selected by the selector, of an operator for the actuator normally disconnected from one of said power-drive elements, a shiftable part on said operator urged to position in which it normally is engageable by the other power-drive element for moving and thereby operatively connecting said operator with said one power drive element, a normally effective but trippable connection enabling the cycles-initiating setting of the total-taking control to shift and hold said part so that it is not engageable by said other power-drive element, and means cooperative with said type-selector, to trip said connection to release said shiftable part as the type-selector is positioned for the first significant digit.

3. In a typewriter-calculating machine having a totalizer comprising denominational orders, and singly operable types and a carriage for typing a total, digit-by-digit, the combination with two power-drive elements operable in cycles, a total-taking control operable to initiate a series of cycles of said elements, one cycle for each order, a type-selector differentially positionable, means acting at the successive cycles to position said type-selector to select the types according to the successive digits, including any non-significant digits, in the totalizer, and an actuator operable for actuating any type selected by the selector, of a normally open coupling closable to connect operatively said actuator to one of said elements, a yieldable connection normally enabling the other element to close said coupling, a member interposable by the operation of said total-taking control to block the closing of said coupling and incidentally cause said connection to yield during the cycle, trippable means to sustain the interposed member, and means cooperative with said type-selector to trip said trippable means, for consequent retraction of said blocking member, as the type-selector is positioned for the first significant digit.

4. In a typewriting-calculating machine having a totalizer, including totalizer wheels of successive denominations; and singly operable types, type impressing means, and a carriage for typing a total, digit by digit; the combination with a mechanical power drive operable in a series of cycles, one cycle for each totalizer wheel, beginning with the wheel of highest order; a total taking control operable to initiate the series of cycles; a type selector differentially positionable upon successive cycles according to the respective digits registered on the successive totalizer wheels to select the corresponding types for printing; and actuating mechanism to operatively relate any type selected by the selector with the type impression means; of flexible means controlled by said cyclic power drive for operatively associating said actuating means with said power drive, a normally idle connection operable incident to operation of said total taking control to render said means ineffective to associate the actuating means with the power drive; means to retain the connection effective; and means operable by the type selector as it is positioned according to the significant digit of highest denomination, to displace the retaining means and enable the return of the connection to its normal position, which releases the means for associating the type actuator and the power drive for operation.

5. In a typewriting-calculating machine having a totalizer, including a plurality of numeral wheels arranged in successive denominational order, and singly operable type carrying bars, a type impressing means, a paper carriage, and a letter spacing escapement for the carriage for typing a total amount digit by digit, the combination with a power driven element operable in a series of cycles, one cycle for each denominational numeral wheel beginning with the highest order wheel; a type bar selector differentially positionable under control of the cyclic power driven element and the successive numeral wheels order by order, to select a numeral type bar at each cycle corresponding to the digit registered on the particular numeral wheel with which the selector is connected; an actuator operable at each cycle to connect any selected type bar in any denominational order, with the type impressing means; and means to initiate the series of cycles; of flexible means shiftable under control of the power driven element to couple the actuator for operation by the power driven element; normally idle restraining means to retain said flexible means against operation by the power driven element; means operable by the cycle-initiating means to shift the normally idle restraining means to effective position whereby to prevent operation of the actuator and hence prevent the printing of any digit; a normally ineffective, auxiliary means to trip the letter spacing escapement; means operable at each cycle of the power driven element to actuate said auxiliary tripping means; and means settable incident to shifting the restraining means to effective position, to shift the auxiliary letter space tripping means to, and retain it in, its effective position.

6. In a typewriting-calculating machine having a totalizer, including a plurality of numeral wheels arranged in successive denominational order, and singly operable type carrying bars, a type impressing means, a paper carriage, and a letter spacing escapement for the carriage for typing a total amount digit by digit, the combination with a power driven element operable in a series of cycles, one cycle for each denominational numeral wheel beginning with the highest order wheel; a type bar selector differentially positionable under control of the cyclic power driven element and the successive numeral wheels order by order, to select a numeral type bar at each cycle corresponding to the digit registered on the particular numeral wheel with which the selector is connected; an actuator operable at each cycle to connect any selected type bar in any denominational order, with the type impressing means; and means to initiate the series of cycles; of normally idle means operable by the cyclic power driven element to impart motion to the actuator; means controlled by the cyclic power driven element to enable the power driven element to operate the motion-imparting means; means under control of the cycle-initiating means to interrupt the control of the normally idle means by the enabling means, whereby to prevent operation of the actuator; a normally ineffective auxiliary means to trip the letter spacing escapement; means operable by the power driven element to actuate the auxiliary escapement tripping means; means settable by said cycle initiating means to shift the auxiliary escapement tripping means to, and to retain it in its effective position, and totalizer wheel controlled means to restore said enabling means to its normal condition.

7. In a typewriting-calculating machine having a totalizer, including a plurality of numeral wheels arranged in successive denominational order, and singly operable type carrying bars, a type impressing means, a paper carriage, and a letter spacing escapement for the carriage for typing a total amount digit by digit, the combination with a power driven element operable in a series of cycles, one cycle for each denominational numeral wheel beginning with the highest order wheel; a type bar selector differentially positionable under control of the cyclic power driven element and the successive numeral wheels order by order, to select a numeral type bar at each cycle corresponding to the digit registered on the particular numeral wheel with which the selector is connected; an actuator operable at each cycle to connect any selected type bar in any denominational order, with the type impressing means; and means to initiate the series of cycles; of means shiftable under control of the power driven element to couple the actuator for operation by the power driven element; normally ineffective means shiftable to position to condition said shiftable means against efficacious operation by the power driven element; means, including a setting member rockable by the cycle-initiating means, and a link connecting the setting member and the normally ineffective means to position said normally ineffective means in its effective position; latching means to maintain the setting member in its set position; a normally ineffective auxiliary escapement tripping means; means operable at each cycle of the power driven element to actuate said auxiliary tripping means, means operable incident to operation of the setting member and link to locate said auxiliary escapement tripping means in effective position; and totalizer wheel-controlled means to trip the latching means to enable the return of the conditioning means and the auxiliary escapement tripping means to their normally ineffective positions.

8. In a typewriting-calculating machine having a totalizer, including a plurality of numeral wheels arranged in successive denominational order, and singly operable type carrying bars, a type impressing means, a paper carriage, and a letter spacing escapement for the carriage for typing a total amount digit by digit, the combination with a power driven element operable in a series of cycles, one cycle for each denominational numeral wheel beginning with the highest order wheel; a type bar selector differentially positionable under control of the cyclic power driven element and the successive numeral wheels order by order, to select a numeral type bar at each cycle corresponding to the digit registered on the particular numeral wheel with which the selector is connected; an actuator operable at each cycle to connect any selected type bar in any denominational order, with the type impressing means; and means to initiate the series of cycles; of means operable by the cyclic power driven element to impart motion to the actuator; means shiftable under control of the power driven element to couple the actuator for operation by the power driven element; normally ineffective means shiftable to condition said shiftable means against operation by the power driven element, including a pick-up pawl operable incident to operation of the cycle-initiating means to displace said coupling means; a normally ineffective auxiliary escapement tripping means; means operable at each cycle of the power driven element, and having a normally retracted extension, to actuate said auxiliary tripping means; means operable by the cycle-initiating means to shift said normally ineffective auxiliary tripping means to its operative position; conditioning means operable by the cycle-initiating means to shift the retracted extension to, and to retain it in effective position relatively to the auxiliary tripping means; totalizer wheel-controlled means to restore said conditioning means and said extension to their normal idle positions; and to disengage the coupling and cycle-initiating means to enable the coupling to return to its effective position, and means to latch the conditioning means when restored, to retain the extension in its normal idle position.

9. In a typewriting-calculating machine having a totalizer, including totalizer wheels of successive denominational orders, digit types, type-impressing means, a carriage, and a letter spacing carriage-escapement device, the combination with a power drive, a cam structure power operable in a series of cycles, one cycle for each totalizer order beginning with the highest order; a total taking control operable to initiate the series of cycles, a single type selector, differentially positionable means acting during the successive cycles to position the type selector to select the types according to the digits registered in the successive totalizer orders including the non-significant zeroes registered on the denominational wheels of higher orders than the wheel registering the significant digit of highest denomination, and an actuator operable by the power drive to operatively relate any selected type with the type-impressing means; of a follower operable by the cam structure; a connection positionable by said follower to enable said cam structure to operate said actuator; mechanism controlled by said total taking control to disable said connection; normally idle mechanism controlled by the total taking control, to enable said cam structure to trip said letter spacing escapement device; and means controlled by the type selector as it is positioned to select the type corresponding to the significant digit of highest denomination, to restore to idle position the cam structure-operated mechanism for tripping the letter spacing escapement device, and to restore said connection-disabling mechanism to its idle position.

10. In a typewriting-calculating machine having a totalizer, including totalizer wheels of successive denominational orders, singly operable types, type impressing means, and a carriage, for typing a total digit by digit, the combination with a power drive operable in a series of cycles, one cycle for each order of said totalizer, beginning with the highest order, a total-taking control operable to initiate the series of cycles; a single differentially positionable type selector; means acting at the successive cycles to position the type selector to select the types according to the successive digits, including any non-significant digits, registered in the totalizer orders, and an actuator operable by the power drive to operatively relate any type selected by the selector with the type impressing means; of mechanism shiftable into and out of effective relation so as to disable or enable, respectively, the operation of said type actuator by said power drive in a cycle, means acting at the cycles-initiating operation of the total-taking control to condition said mechanism to disable the operation of said type actuator by said power drive; and means controlled by the type selector to restore said disabled mechanism as the type selector is positioned for the first significant digit to enable the operation of said actuator by said power drive.

ROBERT ANSCHÜTZ.
ERNST HUGO KÄMMEL.